(12) United States Patent
Jeong

(10) Patent No.: US 7,880,825 B2
(45) Date of Patent: Feb. 1, 2011

(54) BACKLIGHT ASSEMBLY AND LIQUID CRYSTAL DISPLAY DEVICE HAVING THE SAME

(75) Inventor: Seung Chul Jeong, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 333 days.

(21) Appl. No.: 11/859,154

(22) Filed: Sep. 21, 2007

(65) Prior Publication Data
US 2008/0074581 A1   Mar. 27, 2008

(30) Foreign Application Priority Data
Sep. 21, 2006   (KR) .................. 10-2006-0091885

(51) Int. Cl.
*G02F 1/1335*   (2006.01)
(52) U.S. Cl. ................ 349/58; 349/61; 349/62; 349/65; 362/600; 362/561; 362/581
(58) Field of Classification Search ........... 349/61–71; 362/26, 31
See application file for complete search history.

(56) References Cited
U.S. PATENT DOCUMENTS

| | | | | |
|---|---|---|---|---|
| 5,280,372 A * | 1/1994 | Horiuchi | | 349/65 |
| 6,016,175 A * | 1/2000 | Kim | | 349/58 |
| 6,919,941 B2 * | 7/2005 | Huang et al. | | 349/58 |
| 7,033,063 B2 * | 4/2006 | Cha et al. | | 362/632 |
| 7,298,432 B2 * | 11/2007 | Kwon et al. | | 349/58 |
| 7,452,102 B2 * | 11/2008 | Ryu | | 362/225 |
| 2003/0117544 A1 * | 6/2003 | Kim et al. | | 349/58 |
| 2004/0246400 A1 | 12/2004 | Yeom | | |
| 2006/0104067 A1 | 5/2006 | Hwang et al. | | |
| 2008/0079865 A1 * | 4/2008 | Kang et al. | | 349/61 |

* cited by examiner

*Primary Examiner*—David Nelms
*Assistant Examiner*—Thanh-Nhan P Nguyen
(74) *Attorney, Agent, or Firm*—Cantor Colburn LLP

(57) ABSTRACT

A backlight assembly of an LCD device which is capable of securing a enough space to mount a light guide plate by guiding lamp wires in the direction of a rear surface of the backlight assembly includes a lamp, a light guide plate configured to guide light emitted from the lamp, an optical sheet formed at an upper surface of the light guide plate, a mold frame accommodating the lamp, the light guide plate, and the optical sheet, a back cover formed at one side of a rear surface of the mold frame to protect the lamp and light guide plate, lamp wires connected at both ends of the lamp, and a wire outlet penetrating the back cover.

22 Claims, 5 Drawing Sheets

BACKLIGHT ASSEMBLY AND LIQUID CRYSTAL DISPLAY DEVICE HAVING THE SAME

This application claims priority to Korean Patent Application No. 2006-91885, filed Sep. 21, 2006, and all the benefits accruing therefrom under 35 U.S.C. §119, the contents of which in its entirety are herein incorporated by reference.

BACKGROUND OF THE INVENTION

1. Field of the Invention

The present invention relates generally to a liquid crystal display ("LCD") device and, in particular, to a backlight assembly of an LCD device which is capable of securing a space sufficient to mount a light guide plate by forming lamp wires in the direction of a rear surface of the backlight assembly.

2. Description of the Related Art

As society becomes increasingly more information-oriented, LCD devices, which represent one specific type of information display device, continue to increase in popularity.

An LCD device is characterized by a structure in which two substrates oppose each other and have electrodes arranged thereon. Liquid crystal molecules are injected between the two substrates. The liquid crystal molecules are twisted by an electric field generated by applying a voltage to the two electrodes. The LCD device displays an image by varying the transmissivity of light varied according to the arrangement of the liquid crystal molecules.

More specifically, an LCD device includes an LCD panel for displaying an image, a driving circuit for driving the LCD panel, and a backlight assembly for supplying light to the LCD panel.

The backlight assembly includes a lamp which generates light. To supply power to the lamp, lamp wires are connected to both ends of the lamp. The lamp wires are further connected to an inverter supplying a suitable power voltage for operation of the lamp.

In conventional LCD devices, the lamp wires are formed at a lateral side of the backlight assembly. Accordingly, a sufficient space for accommodating the lamp wires should be secured at the lateral side of the backlight assembly. Since the entire size of the backlight assembly is previously determined, the lamp and a light guide plate are shifted to a center of the backlight assembly to accommodate an outlet space for the lamp wires. In such a configuration, however, the luminance of the backlight assembly becomes unstable. Moreover, it is difficult to use two lamps.

Furthermore, additional labor is needed to affix the lamp wires to one other using a wire tape in order to prevent the lamp wires (formed at the lateral side of the backlight assembly) from interfering with a main body of the backlight assembly. In addition, the lamp wires may also be damaged by an external force during a module assembly process.

BRIEF SUMMARY OF THE INVENTION

Aspects of the present invention provide a backlight assembly and an LCD device having the same that are capable of sufficiently securing a space for arranging a light guide plate by forming lamp wires at a rear surface of a backlight assembly.

In an exemplary embodiment of the present invention, a backlight assembly of a liquid crystal display device having a liquid crystal display panel includes a light generating unit, a light guide plate configured to guide light emitted from the light generating unit to the liquid crystal display panel, an optical sheet formed at an upper surface of the light guide plate, a mold frame accommodating the lamp, the light guide plate, and the optical sheet, a back cover formed at one side of a rear surface of the mold frame to protect the light generating unit and light guide plate, wire connected to the light generating unit so as to supply electric power to the light generating unit, and a wire outlet penetrating the back cover.

In another exemplary embodiment of the present invention, a backlight assembly of a liquid crystal display device having a liquid crystal display panel includes a lamp, a light guide plate configured to guide light emitted from the lamp to the liquid crystal display panel, an optical sheet arranged at an upper surface of the light guide plate, a mold frame accommodating the lamp, the light guide plate, and the optical sheet, lamp wires connected to both ends of the lamp, a back cover which includes a wire groove configured to provide a space in which the lamp wires are arranged formed at one side of a rear surface of the mold frame to protect the lamp and the light guide plate, back cover and a wire outlet formed by penetrating the wire groove.

In another exemplary embodiment of the present invention, a liquid crystal display includes a liquid crystal display panel, a driving unit configured to drive the liquid crystal display panel, a lamp configured to provide light to the liquid crystal display panel, a light guide plate configured to guide light emitted from the lamp to the liquid crystal display panel, an optical sheet formed at an upper surface of the light guide plate, a mold frame accommodating the lamp, the light guide plate, and the optical sheet, a back cover formed at one side of a rear surface of the mold frame to protect the lamp and light guide plate, lamp wires connected at both ends of the lamp, and a wire outlet penetrating the back cover.

In another exemplary embodiment of the present invention, a liquid crystal display includes a liquid crystal panel, and a driving unit configured to drive the liquid crystal display panel, a lamp configured to provide light to the liquid crystal display panel, a light guide plate configured to guide light emitted from the lamp to the liquid crystal display panel, an optical sheet formed at an upper surface of the light guide plate, a mold frame accommodating the lamp, the light guide plate, and the optical sheet, lamp wires connected to both ends of the lamp, a back cover which includes a wire groove configured to provide a space in which the lamp wires are arranged formed at one side of a rear surface of the mold frame to protect the lamp and the light guide plate, back cover and a wire outlet penetrating the wire groove.

BRIEF DESCRIPTION OF THE DRAWINGS

The above and other aspects, features and advantages of the present invention will be more apparent from the following detailed description in conjunction with the accompanying drawings, in which.

DETAILED DESCRIPTION OF THE INVENTION

Figure 1:
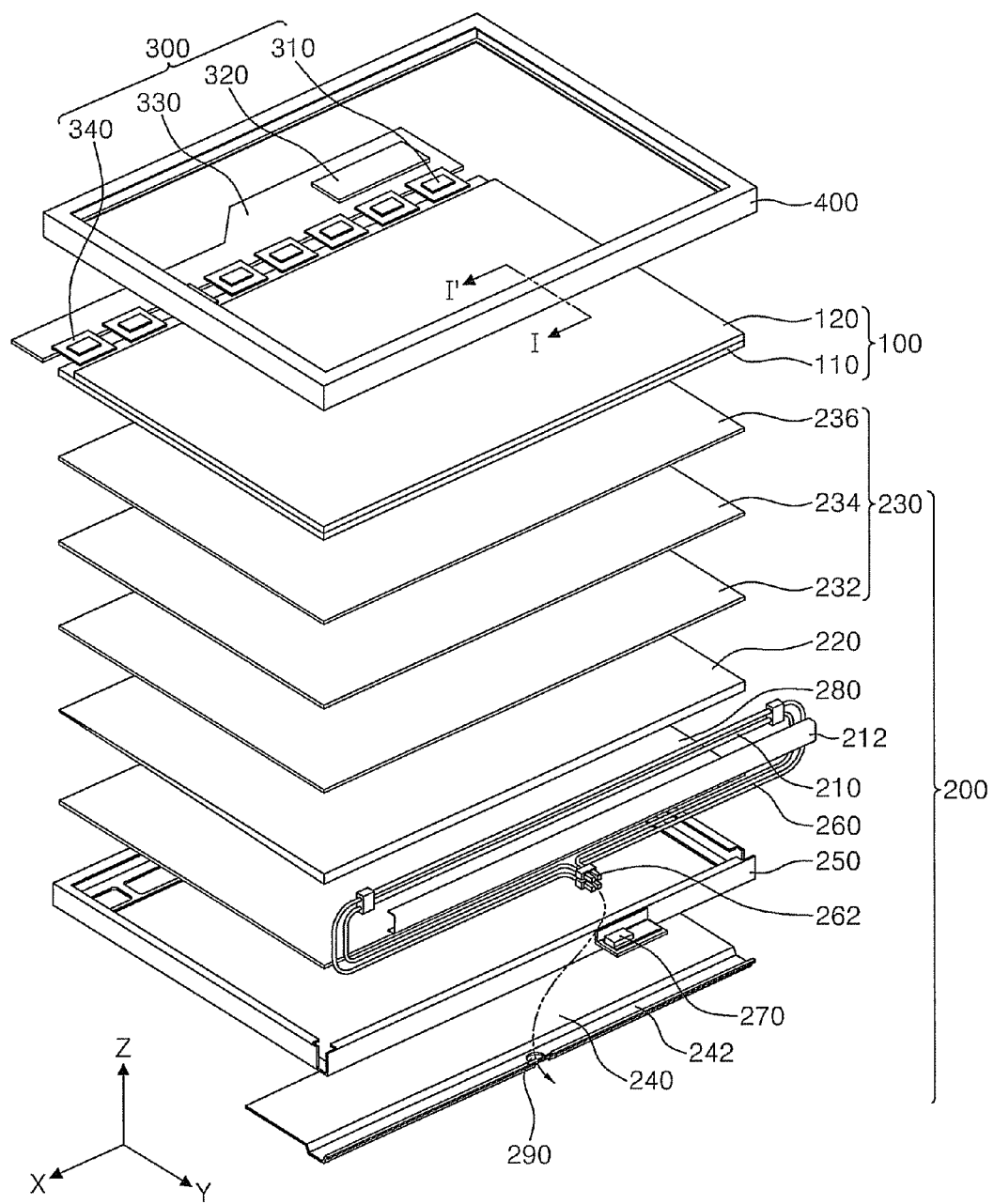
FIG. 1 is an exploded perspective view of an LCD device according to an exemplary embodiment of the present invention.

The present invention is described more fully hereinafter with reference to the accompanying drawings, in which exemplary embodiments of the invention are shown. The present invention may, however, be embodied in many different forms and should not be construed as limited to the exemplary embodiments set forth herein. Rather, theses exemplary embodiments are provided so that this disclosure will be thorough and complete, and will fully convey the scope of the invention to those skilled in the art It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, the present invention will be explained in detail with reference to the accompanying drawings.

Figure 2:
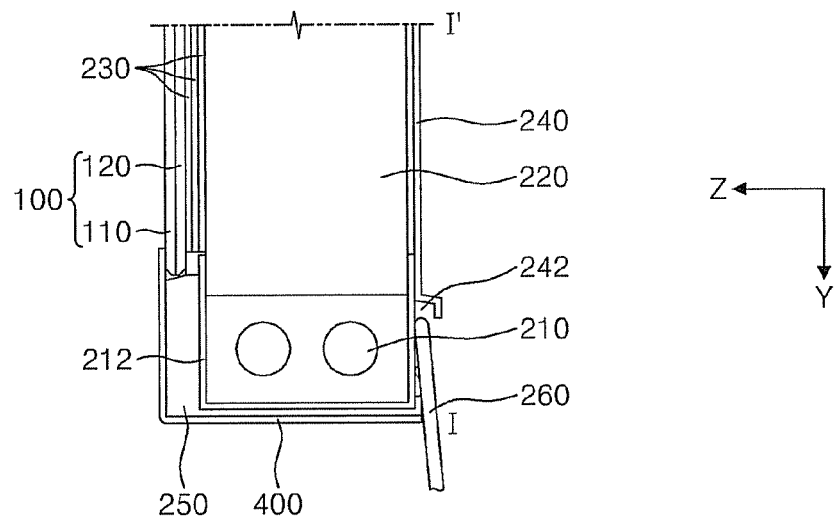
FIG. 2 is a cross sectional view taken along line I-I' of FIG. 1.
Figure 3:
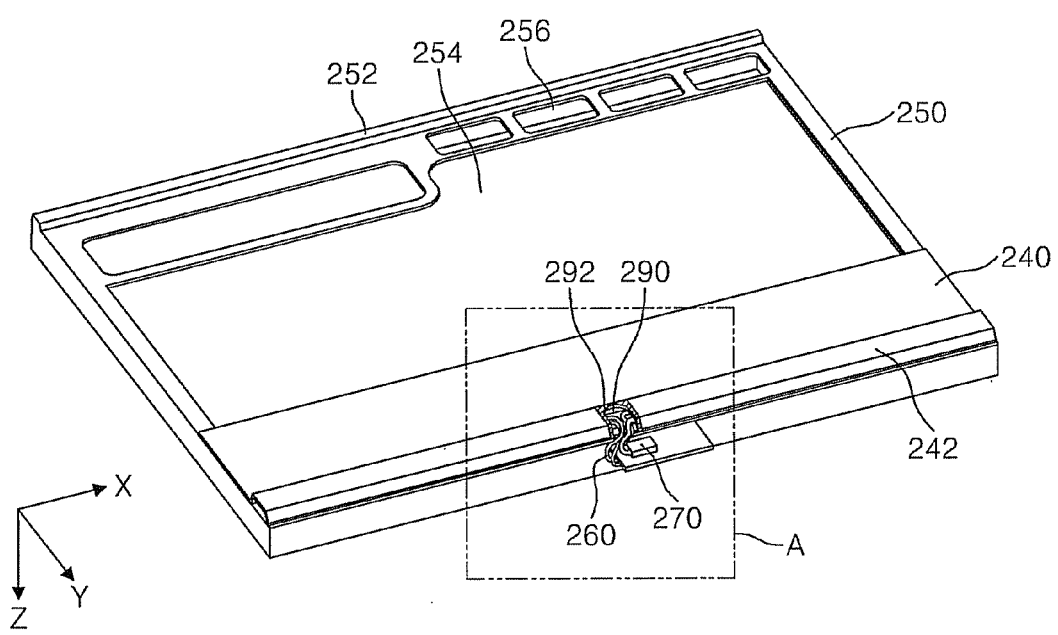
FIG. 3 is a rear perspective view of a backlight assembly of the LCD device of FIG. 1.

FIG. 1 is an exploded perspective view of an LCD device according to an exemplary embodiment of the present invention, FIG. 2 is a cross sectional view taken along line I-I' of FIG. 1, and FIG. 3 is a rear perspective view of a backlight assembly of the LCD device of FIG. 1.

Referring to FIG. 1, the LCD device includes an LCD panel 100 for displaying a picture in accordance with input video signals, a backlight assembly 200 for providing light to the LCD panel 100, and a driving unit 300 for driving the LCD panel 100.

The LCD panel 100 includes a thin film transistor ("TFT") substrate 110 and a color filter substrate 120 spaced apart from and facing each other. Liquid crystal molecules (not shown) are injected between the two substrates 110 and 120.

The color filter substrate 120 is implemented with a black matrix, a color filter, a common filter, and a polarizer film formed on a transparent insulating substrate such as a glass or plastic substrate. The black matrix of an opaque metal divides sub-pixels from each other and prevents light leakage between sub-pixels. The color filter is formed on a sub-pixel basis and displays a color. The common electrode establishes an electric field together with a pixel electrode formed on the TFT substrate, thereby driving the liquid crystal molecules. The polarizer film is formed on a top of the color filter substrate 120 so as to align the liquid crystal molecules.

The TFT substrate 110 is implemented with gate lines, data lines, TFTs, the pixel electrode, and a polarizer film formed on a transparent insulating substrate, such as a glass or plastic substrate.

The gate line and data line for each sub-pixel are connected to a gate electrode and a source electrode of a corresponding TFT for supplying a scanning signal and a data signal, respectively. The TFT is arranged at an intersection of the gate line and data line and functions as a switching device for a designated pixel. The TFT includes a gate electrode, a source electrode, a drain electrode, and a semiconductor layer. The pixel electrode is connected to the drain electrode of the TFT and forms an electric field together with the common electrode of the color filter substrate 120. The polarizer film of the TFT substrate 110 aligns the liquid crystal molecules in a prescribed direction.

The driving unit 300 is electrically connected to the TFT substrate 110 and supplies driving signals to the gate lines and the data lines. In particular, the driving unit 300 includes a gate driving integrated circuit ("IC") (not shown), a data driving IC 310, and a timing controller 320. The gate driving IC is implemented in the form of a film so as to be mounted on a gate tape carrier package ("TCP") and is electrically connected to the LCD panel 100 through a TCP bonding process. The gate driving IC may be directly connected to the TFT substrate 110. The data driving IC 310 is mounted on a data TCP 340 of a film form and is electrically connected to the LCD panel 100 through the TCP bonding process.

The timing controller 320 is formed on a printed circuit board "PCB" 330 and generates a timing signal on the basis of input signals received from an external circuit. The timing signal is provided to the gate driving IC and the data driving IC 310. The gate driving IC supplies the timing signal from the timing controller 320 and a power signal from a power supply to the gate line. The data driving IC 310 supplies the timing signal, a picture signal, and the power signal to the data line through a signal line formed on the data TCP 340.

The backlight assembly 200 includes lamps 210, a light guide plate 220, an optical sheet 230, a back cover 240, a mold frame 250, and lamp wires 260. The lamps 210 emitting light may be, for example, cold cathode fluorescent lamps ("CCFLs") or external electrode fluorescent lamps ("EEFLs"). In an exemplary embodiment, the lamps 210 are arranged at one side of the mold frame 250. One or two lamps may be used for the LCD panel. When two lamps are used, the lamps are transversely arranged parallel to each other as shown in FIGS. 1 and 2.

As shown in FIG. 1, the lamp wires 260 are connected to both ends of the lamps 210. The lamp wires 260 supply a power voltage used to drive the lamps 210. Where CCFLs or EEFLs are used as the lamps 210, a high voltage is applied to the lamps 210 such that the lamp wires 260 connect an inverter 270, which provides a suitable voltage for driving the lamps 210. One end of each lamp wire 260 is connected to the inverter 270 through a connector 262.

The lamps 210 are partially surrounded by a lamp cover 212, which is opened in the direction of the light guide plate 220. The lamp cover 212 is arranged so as to maintain a predetermined distance from the lamps 210 and is also provided with a reflection surface on its inner wall. The reflection surface may be formed by coating a reflective material or applying a reflective sheet on or to the inner wall of the lamp cover 212. Alternatively, a reflective sheet 280 provided at a rear side of the light guide plate 220 may be utilized for the reflective layer of the lamp cover 212 by bending one edge thereof in the shape of the lamp cover 212.

Light emitting diodes arranged in a row may be applicable to the lamps 210.

The light guide plate 220 guides light emitted from the lamps 210 to the LCD panel 100. As shown in FIG. 2, the light guide plate 220 is arranged so as to maintain a predetermined distance from the lamp 210. When two lamps are used, the distance between the light guide plate 220 and the lamps 210 is wider (e.g., two or three times wider) than when a single lamp is used. That is, when two lamps are used, a space should be secured in a Y-axis direction (FIG. 1). In an exemplary embodiment, since the space secured for guiding the lamp wires in the denoted Y-axis direction (as in a conventional backlight assembly) is not required in the present embodiment, it is possible to move the lamps 210 even further along the direction of the Y-axis.

The reflective sheet 280 reflects light emitted from the lamps 210 to the light guide plate 220 so as to improve light usage efficiency.

As particularly illustrated in FIG. 1, the optical sheet 230 further includes a diffuser sheet 232, a prism sheet 234, and a protector sheet 236. The diffuser sheet 232 diffuses light emitted by the light guide plate 220 evenly over the LCD panel 100, and the prism sheet 234 concentrates light passing through the diffuser sheet 232 so as to enhance luminance. The protector sheet 236 protects the prism sheet 234 from being contaminated or scratched, and also prevents the movement of other sheets.

The above-described lamps 210, the light guide plate 220, the reflective sheet 280, and the optical sheet 230 are disposed within the mold frame 250. After the lamps 210, the light guide plate 220, the reflective sheet 280, and the optical sheet 230 are disposed in the mold frame 250, the LCD panel 100 is also seated on the optical sheet 230. The PCB 330 mounted on the LCD panel 100 is then bent so as to contact a rear surface of the mold frame 250. As shown in FIG. 3, the mold frame 250 is provided with an accommodating projection 252, a PCB inserting groove 254, and a data driving IC inserting groove 256.

After the backlight assembly 200 and the LCD panel 100 are contained in the mold frame 250, the LCD panel 100 and the mold frame 250 are tightly fixed by means of a top chassis 400.

A back cover 240 is mounted at one side of the rear surface of the mold frame 250. More specifically, the back cover 240 is attached to the rear surface of the mold frame 250 at which the lamps 210 are arranged. The back cover 240 protects the lamp 210 and the light guide plate 220. The back cover may have at least one side wall that is extended upward.

A wire outlet 290 is formed by penetrating the back cover 240, as opposed to a conventional backlight assembly in which the lamp wires are formed at a lateral surface of the backlight assembly and a wire outlet is formed by penetrating a lateral surface of the mold frame. In one exemplary embodiment, since the lamp wires 260 are led out through the wire outlet 290 formed at the rear surface of the back cover 240, it is possible to secure a space in the depicted Y-axis direction of the backlight assembly 200. The secured space enables the lamps 210 to be moved to the lateral side of the mold frame 250 and enables the light guide plate 220 to extend further into the lamp cover 212, resulting in improvement of luminance.

The wire outlet 290 is formed at a sufficient size to pass a plurality of lamp wires 260 at the same time. The back cover 240 (having the wire outlet 290 formed therein) is made from, for example, a thin stainless steel plate. Thus, the edges around the wire outlet 290 may be sharp. In order to prevent the lamp wires 260 from being damaged by the sharp edges of the wire outlet 290, the edges of the wire outlet 290 are covered by a wire protection member 292, as shown in FIG. 3.

The wire protection member 292 encompasses an inner wall of the wire outlet 290. Accordingly, a part of the back cover 240 contacting with the lamp wire 260 is covered by the wire protection member 292, which has a soft, curved surface. The wire protection member 292 may be formed from a soft material such as rubber for example.

Figure 6:
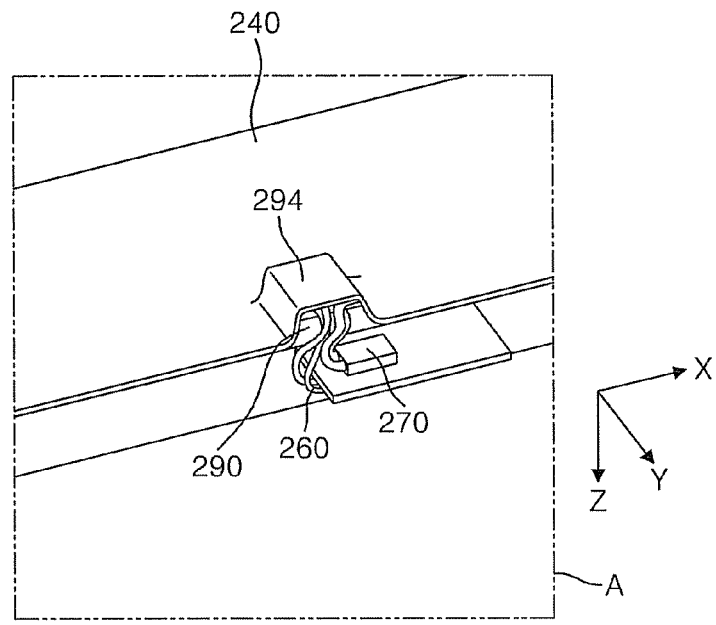
FIG. 6 is an enlarged view illustrating a region A of the back cover of FIG. 3 according to another exemplary embodiment of the present invention.
Figure 7:
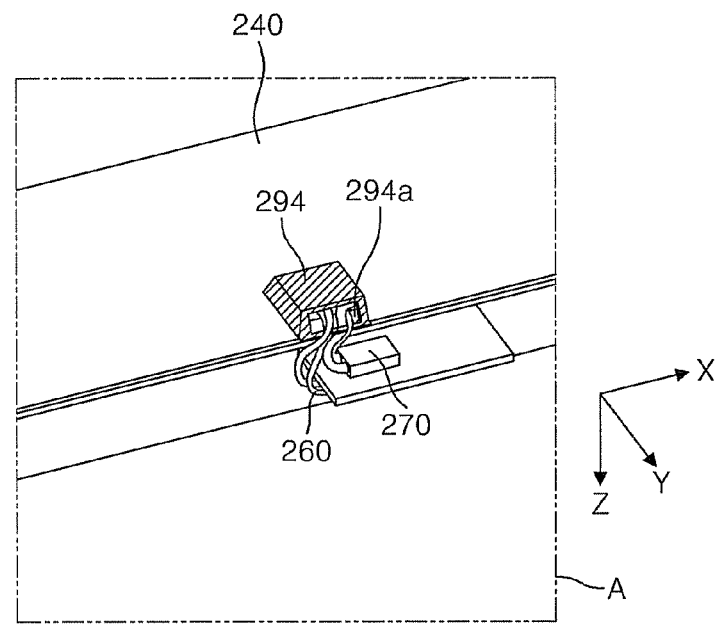
FIG. 7 is an enlarged view illustrating a region A of the back cover of FIG. 3 according to another exemplary embodiment of the present invention.

As shown in FIGS. 6 and 7, a wire cap 294 (covering the lamp wires 260 led out through the wire outlet 290) may be formed on the back cover 240. In one embodiment, the wire cap 294 may be formed from a separate component with respect to the back cover 240, as shown in FIG. 7, or by modifying the back cover 240 as shown in FIG. 6.

Where the wire cap 294 is formed from a separate component, the wire cap 294 is tightly coupled to the wire outlet 290 and protrudes from the back cover 204, thereby protecting the lamp wires 260 from external shock. One side of the wire cap 294 is opened and used as an outlet hole 294a through which the lamp wires 260 are guided. Another opening (not specifically shown in FIG. 7) corresponding to the wire outlet 290 is formed at a portion perpendicular to the outlet hole 294a.

As shown in FIG. 6, the lamp wires 260, guided in a vertical direction with respect to the back cover 240 by the wire cap 294, are bent at substantially a right angle and are directed toward the lateral side of the backlight assembly 200 since the inverter 270 is located at the lateral side of the backlight assembly 200. The wire outlet 290 is formed at a part closest to the inverter 270 so as to minimize the exposure of the lamp wires 260. Accordingly, there is no additional labor associated with protecting the exposed lamp wires by means of, for example, a wire tape.

In the embodiment where the wire cap 294 is formed by modifying the back cover 240 as shown in FIG. 6, the back cover 240 extends from an edge facing the inverter 270 such that the wire outlet 290 is defined by the wire cap 294 itself. Stated another way, the wire cap 294 is formed from the back cover 240 material in the embodiment of FIG. 6.

Figure 8:
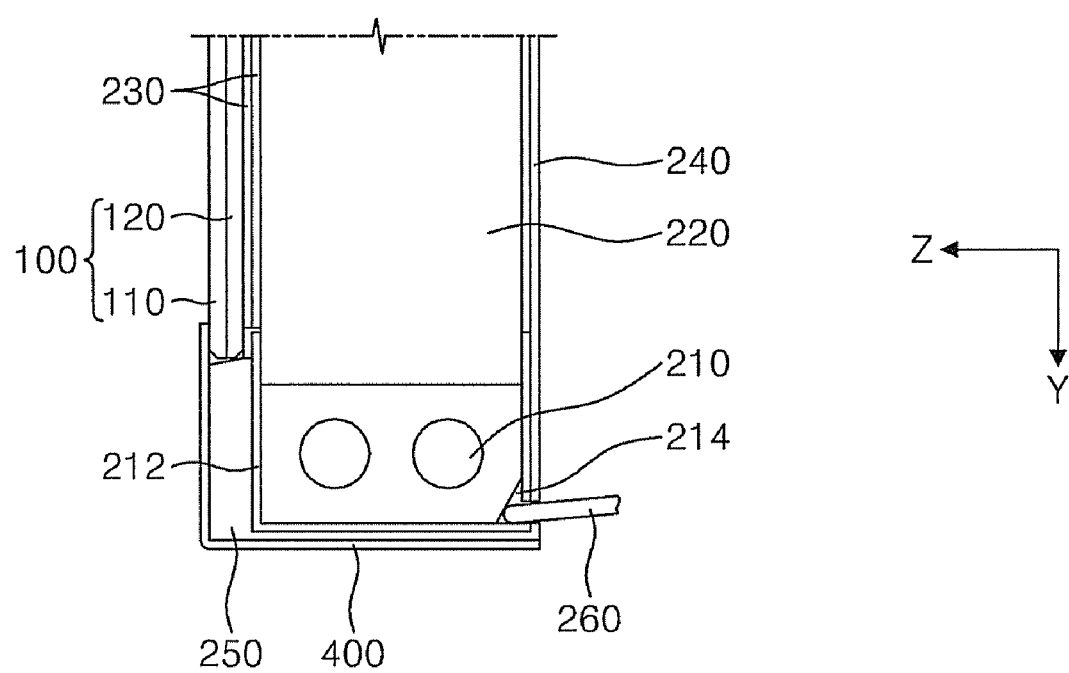
FIG. 8 is a cross sectional view of a backlight assembly according to another embodiment of the present invention.

In order to electrically couple the lamp 210 to the inverter 270, the lamp wires 260 connected to both ends of the lamps 210 are guided to the wire outlet 290. In an exemplary embodiment, a space for guiding the lamp wires 260 is secured below the lamps 210. That is, a lamp wire space 214 is ensured by cutting an edge of a lower side of the lamp cover 212 as shown in FIG. 8.

As described above, the space for guiding the lamp wires may be secured by modifying the back cover 240 rather than the lamp cover 212. That is, the back cover 240 is bent near its low edge such that a wire groove 242 is formed in parallel with the lamps 210 as shown in FIG. 2. Accordingly, a part of the back cover 240 protrudes toward the rear side of the backlight assembly 200. The wire outlet 290 is formed by penetrating the protruded part of the back cover 240.

Figure 5:
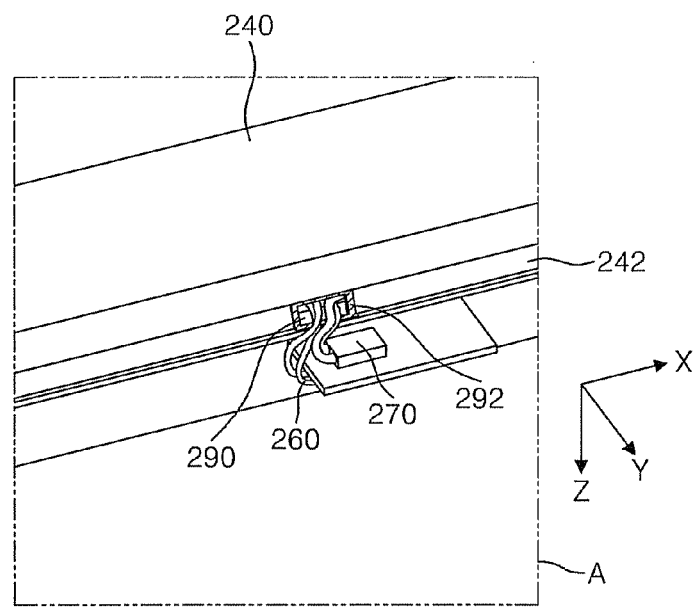
FIG. 5 is an enlarged view illustrating a region A of the back cover of FIG. 3 according to another exemplary embodiment of the present invention.

The wire outlet 290 is formed at a location closest to the inverter 270. The wire outlet 290 may be formed in various shapes. As shown in FIG. 5 for example, the wire outlet 290 is formed by penetrating a side wall of a wire groove 242 formed by bending a portion of the back cover 240 so as to face the inverter 270. Edges around the wire outlet 290 are covered by a wire protection member 292.

Figure 4:
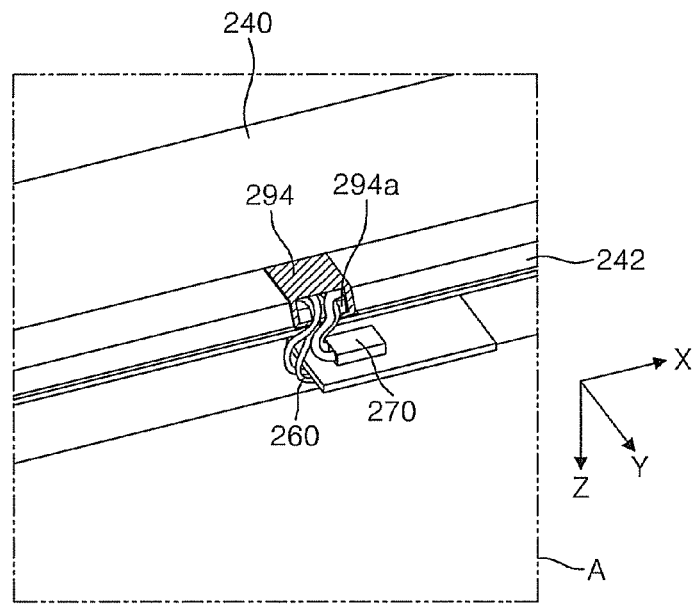
FIG. 4 is an enlarged view illustrating a region A of a back cover of FIG. 3 according to an exemplary embodiment of the present invention.

Alternatively, the wire outlet 290 may be formed by cutting a rear wall, as well as a side wall of the wire groove 242 as shown in FIG. 4. In this case, the wire cap 294 including the outlet hole 294a is coupled to the wire outlet 290 and guides the lamp wires in the direction of the inverter 270. The wire cap 294 also protects the lamp wires 260.

As described above, the backlight assembly of the present invention embodiments enables lamp wires to be guided to a rear side of the backlight unit, and thus it is possible to secure a space sufficient to arrange the light guide plate. By securing the space for the light guide plate, a distance between the light guide plate and the lamp can be secured even when two lamps are employed.

Also, since the backlight assembly of the present invention allows lamp wires to be led out to a rear side of the backlight assembly, it is possible to prevent the lamp wires from disturbing installations of other devices outside the mold frame.

Also, the backlight assembly of the present invention is advantageous since no additional labor is needed for protecting the lamp wires exposed at a lateral side of the mold frame with a wire tape is required.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A backlight assembly of a liquid crystal display device having a liquid crystal display panel, comprising:
   a light generating unit;
   a light guide plate configured to guide light emitted from the light generating unit to the liquid crystal display panel;
   an optical sheet formed at an upper surface of the light guide plate;
   a mold frame accommodating the light generating unit, the light guide plate, and the optical sheet;
   a back cover formed at one side of a rear surface of the mold frame to protect the light generating unit and light guide plate;
   a wire connected to the light generating unit so as to supply electric power to the light generating unit; and
   a wire outlet penetrating the back cover.

2. The backlight assembly of claim 1, further comprising a wire protection member covering edges of the wire outlet to protect the wire.

3. The backlight assembly of claim 2, further comprising a wire cap covering the lamp wires guided through the wire outlet.

4. The backlight assembly of claim 3, wherein the wire cap is formed by bending one side of the back cover to be protruded toward a rear surface of the backlight assembly.

5. The backlight assembly of claim 3, wherein the wire cap is formed from the back cover.

6. The backlight assembly of claim 3, wherein the wire cap comprises a separate component with respect to the back cover, with the wire cap tightly coupled to the back cover.

7. The backlight assembly of claim 1, wherein the wire is drawn out through the wire outlet to opposition direction of the liquid crystal display panel.

8. A backlight assembly of a liquid crystal display device having a liquid crystal display panel, comprising:
   a lamp;
   a light guide plate configured to guide light emitted from the lamp to the liquid crystal display panel;
   an optical sheet arranged at an upper surface of the light guide plate;
   a mold frame accommodating the lamp, the light guide plate, and the optical sheet;
   lamp wires connected to both ends of the lamp;
   a back cover formed at one side of a rear surface of the mold frame to protect the lamp and the light guide plate, wherein the back cover includes a wire groove configured to provide a space in which the lamp wires are arranged; and
   a wire outlet penetrating the wire groove.

9. The backlight assembly of claim 8, wherein the wire outlet penetrates a lateral side of the wire groove.

10. The backlight assembly of claim 8, further comprising a wire protection member covering edges of the wire outlet to protect the lamp wires.

11. The backlight assembly of claim 8, wherein the wire groove is formed by downwardly bending the side of the bottom.

12. A liquid crystal display, comprising:
   a liquid crystal display panel;
   a driving unit configured to drive the liquid crystal display panel,
   a lamp configured to provide light to the liquid crystal display panel;
   a light guide plate configured to guide light emitted from the lamp to the liquid crystal display panel;
   an optical sheet formed at an upper surface of the light guide plate;
   a mold frame accommodating the lamp, the light guide plate, and the optical sheet;
   a back cover formed at one side of a rear surface of the mold frame to protect the lamp and light guide plate;
   lamp wires connected at both ends of the lamp; and
   a wire outlet penetrating the back cover.

13. The liquid crystal display of claim 12, wherein the backlight assembly further comprises a wire protecting member covering edges of the wire outlet to protect the lamp wires.

14. The liquid crystal display of claim 13, wherein the backlight assembly further comprises a wire cap covering the lamp wires guided through the wire outlet.

15. The liquid crystal display of claim 14, wherein the wire cap is formed by bending one side of the back cover to be protruded toward a rear surface of the backlight assembly.

16. The liquid crystal display of claim 14, wherein the wire cap is formed from the back cover.

17. The liquid crystal display of claim 14, wherein the wire cap comprises a separate component with respect to the back cover, with the wire cap tightly coupled to the back cover.

18. A liquid crystal display, comprising:
- a liquid crystal panel;
- a driving unit configured to drive the liquid crystal display panel;
- a lamp configured to provide light to the liquid crystal display panel;
- a light guide plate configured to guide light emitted from the lamp to the liquid crystal display panel;
- an optical sheet formed at an upper surface of the light guide plate;
- a mold frame accommodating the lamp, the light guide plate, and the optical sheet;
- lamp wires connected to both ends of the lamp;
- a back cover formed at one side of a rear surface of the mold frame to protect the lamp and the light guide plate, wherein the back cover includes a wire groove configured to provide a space in which the lamp wires are arranged; and
- a wire outlet penetrating the wire groove.

19. The liquid crystal display of claim 18, wherein the wire outlet is formed by penetrating a lateral side of the wire groove.

20. The liquid crystal display of claim 19, further comprising a protection member covering edges of the wire outlet to protect the lamp wires.

21. The liquid crystal display of claim 19, wherein the wire out is formed at a central part of the back cover.

22. The liquid crystal display of claim 18, wherein the wire groove is formed by downwardly bending the side of the bottom.

\* \* \* \* \*